United States Patent [19]
Cox

[11] Patent Number: 5,369,903
[45] Date of Patent: Dec. 6, 1994

[54] DEER LURE AND METHOD

[76] Inventor: D. Blake Cox, 5385 Valleydale Rd., Kernersville, N.C. 27284

[21] Appl. No.: 98,466

[22] Filed: Jul. 28, 1993

[51] Int. Cl.⁵ .......................................... A01M 31/00
[52] U.S. Cl. ................................................. 43/1
[58] Field of Search ................................................. 43/1

[56] References Cited

U.S. PATENT DOCUMENTS

| | | | |
|---|---|---|---|
| 3,046,192 | 7/1962 | Bilyeu | 167/48 |
| 4,472,377 | 9/1984 | Teranish et al. | 424/84 |
| 4,506,806 | 3/1985 | Lincoln et al. | 222/175 |
| 4,609,245 | 9/1986 | Sakschek | 239/36 |
| 4,667,430 | 5/1987 | Ziese, Jr. | 43/1 |
| 4,773,177 | 9/1988 | Gray, II et al. | 43/1 |
| 4,788,787 | 12/1988 | Konietzki | 43/1 |
| 4,944,940 | 7/1990 | Christenson, II | 424/84 |
| 4,953,763 | 9/1990 | Kierum et al. | 43/1 |
| 5,148,949 | 9/1992 | Luca | 222/175 |

Primary Examiner—P. Austin Bradley
Assistant Examiner—Chuck Y. Mah

[57] ABSTRACT

A deer lure and method is presented whereby urine from a domestic goat is utilized. An absorbent cotton is saturated with undiluted urine and is suspended in a substantially triangular type area configuration whereby the sides of the triangle are each about twenty yards in length with absorbers at the points of the triangle. Additional urine is placed on the ground in the center of the triangle. Both buck and doe are attracted as the scent producing urine as it permeates the atmosphere. A method of collecting urine from domestic goats and apparatus is also provided utilizing a mesh covered pan.

7 Claims, 2 Drawing Sheets

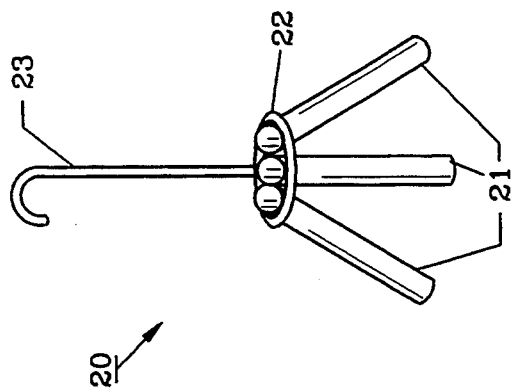
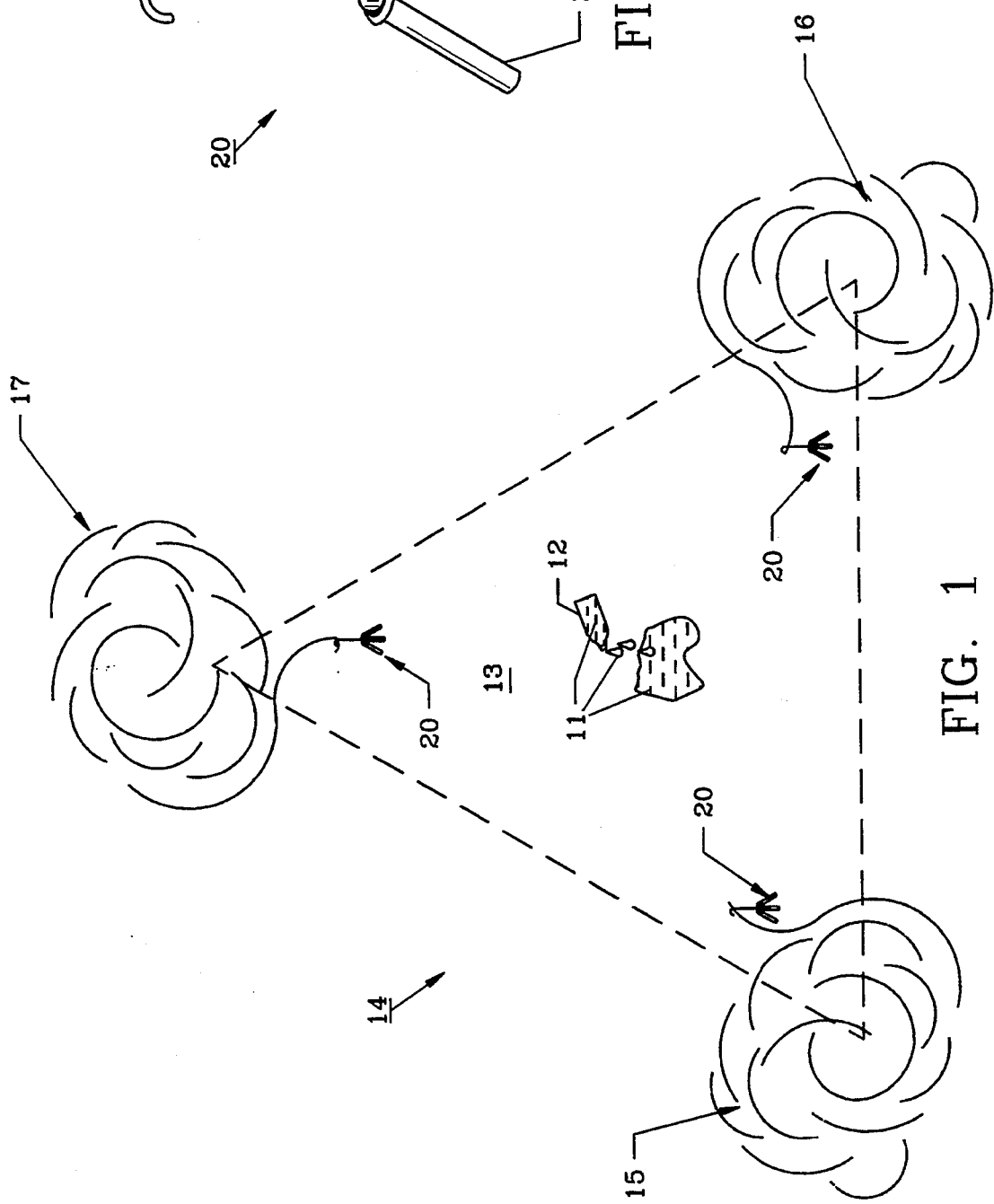

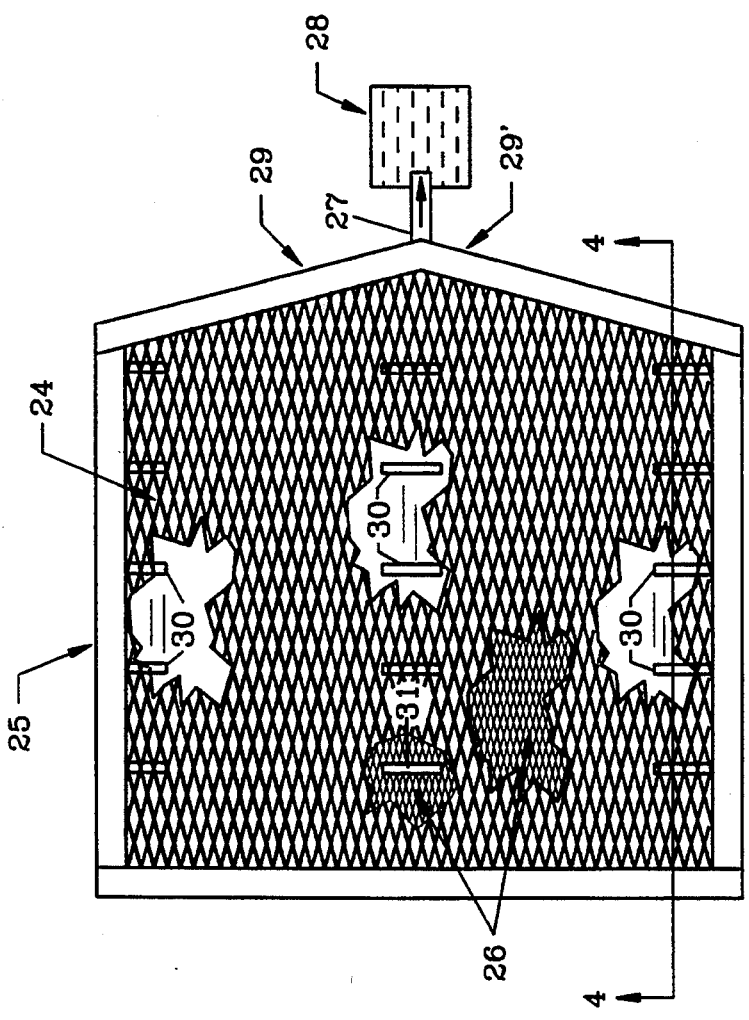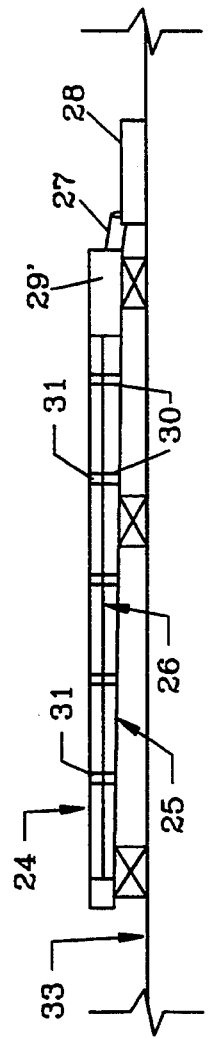

DEER LURE AND METHOD

BACKGROUND OF THE INVENTION

1. Field of the Invention

The invention herein pertains to hunting and particularly to luring deer by the use of the urine collected from a domestic goat which is to attract the deer to a specific location by suspending absorbers containing urine in a triangular area.

2. Description of the Prior Art and Objectives of the Invention

Various lures and scents have been used in the past to attract deer for hunting purposes. U.S. Pat. No. 3,046,192 utilizes a combination of musk and urine from an animal in the deer family. U.S. Pat. No. 4,667,430 describes the use of doe urine as a deer lure. Others have invented containers and dispensing apparatus for use in luring deer such as U.S. Pat. Nos. 4,609,245, 4,771,563, 4,773,177 and 5,148,949. While these patents all provide advantages under certain conditions, a better method and scent producing lure was needed which performs under various conditions and which provided better attractant qualities. Also, a scent producing lure was needed which was in abundant supply and was relatively low in cost. Additionally, a new method of luring deers would be helpful which would increase the opportunity of a hunter or photographer. Thus, with the problems and disadvantages of prior art scent producing lures and methods, the present invention was conceived and one of its objectives is to provide a method of hunting or luring deer which is relatively inexpensive and is effective in attracting deer from relatively remote distances.

It is still another objective of the present invention to provide a deer lure and method in which the scent producing lure is in abundant supply and relatively inexpensive to obtain and process.

It is yet another objective of the present invention to provide a method for luring deer in which the lure is both an attractant and a mask for the scent of the hunter or photographer.

Various other objectives and advantages of the present invention will become apparent to those skilled in the art as a more detailed presentation is set forth below.

SUMMARY OF THE INVENTION

The invention herein comprises a method of luring deer for hunting, photographing or other purposes utilizing a scent producing composition comprising urine from various breeds of a domestic goat (*Capra hircus*). It has been determined that the use of the urine in undiluted form provides extremely effective scent production which can he used by saturating an absorbent such as cotton with the urine and suspending it above the ground from a tree limb or the like to allow the scent to permeate the surrounding atmosphere. Both male and female deer are attracted to the scent and when smelled, they quickly approach the area of emanation. In addition to attracting deer, the scent will likewise mask the odor of a photographer, hunter or the like which is both useful and necessary.

BRIEF DESCRIPTION OF THE DRAWINGS

FIG. 1 demonstrates in schematic fashion a triangular area of scent emanation utilizing the urine from a domestic goat;

FIG. 2 shows a scent producing absorber as may be suspended from a tree limb or the like;

FIG. 3 provides a top plan view of an urine collection pan; and

FIG. 4 illustrates in cross-sectional view the pan as seen in FIG. 3 along lines 4—4.

DESCRIPTION OF THE PREFERRED EMBODIMENT

The preferred composition for use as an attractant and lure for deer consists of undiluted urine from a domestic goat (*Capra hircus*). The preferred method of using the urine consists of forming an equilateral triangle having sides of approximately twenty yards in length whereby the scent producing composition is used to saturate cotton absorbers which are suspended approximately six to ten feet above the ground. Also, in the center of the triangle two to tour ounces of scent producing composition are poured. This triangle then becomes an area whereby the scent emanating therefrom will attract deer from substantial distances.

The preferred method of collecting the scent producing composition consists of positioning domestic goats of the desired breed on a conventional wire grate having one-half inch openings above a mesh made from expanded steel which are spaced above a collection pan. The pan has a horizontal bias whereby urine which passes through the upper grate and mesh will drain to a pan below and then through a tube at one end into a removable container. Spacers or supports are positioned within the pan to hold the upper grate which comes under the weight of the goats thereon. The mesh may have openings of one-eighth to one-quarter inches to filter solid waste matter from the liquid waste which passes through the upper grate to the collection pan below. A removable container is used to collect and transport the liquid waste or urine for further processing and use as a lure.

DETAILED DESCRIPTION OF THE DRAWINGS AND OPERATION OF THE INVENTION

For a more complete understanding of the invention and its operation, turning now to the drawings, FIG. 1 demonstrates a method for attracting deer for hunting or photographing purposes whereby a scent producing composition such as urine 11 which is contained within bottle 12 and is poured on ground 13 at the approximate center of triangular area 14 as may be formed by trees 15, 16 and 17. Trees 15, 16 and 17 are spaced a distance of approximately twenty yards apart. Suspended from branches as shown schematically in FIG. 1 are absorbers 20, seen in more detail in FIG. 2. Absorbers 20 may consist of three conventional densely packed cotton cylinders 21 which are held together by a wire 22 attached to hook 23. Absorbers 20 are suspended from tree branches as shown schematically in FIG. 1 at a height of six to ten feet from the ground to allow maximum permeation into the surrounding atmosphere. Absorber 20, before suspension from a tree, is first dipped or otherwise saturated with urine 11 obtained from one or more breeds of domestic goats. Such triangular placement allows a wide zone of attractant while masking the odor of the hunter, photographer or other person nearby. As would be understood, the present invention could be used for other purposes in addition to hunting, photographing or trapping.

As hereinbefore explained, the preferred attractant for use consists of undiluted urine from a domestic goat, scientifically referred to as *Capra hircus*. Various breeds such as Saanen, Toggenburg, Alpine and Anglo-nubrian may be used. In order to collect urine 11, goats of the desired breed are tied or otherwise confined atop collection pan 25 as shown in FIG. 3. Collection pan 25 may be for example, approximately ten feet by ten feet in length and width and may have a depth of three to four inches, depending on the exact number of goats used. The size shown will easily accommodate four adult goats simultaneously. Pan 25 is covered with a course upper wire grate 24 and lower fine mesh 26 formed from expanded metal such as conventional for industrial filter purposes. Thus, goats positioned on grate 24 urinate directly thereon whereby both liquid and solid wastes pass through. Solid waste collects on mesh 26 and liquid waste passes to the bottom of metal pan 25 as shown in FIG. 4. Pan 25 is positioned with a left to right downward slant as shown in FIG. 4 whereby urine passing through mesh 26 will drain through tube 27 and into removable container 28 where it can be further filtered to remove any solid waste or other particulate matter and can be further processed such as by additional filtering before use. As further shown in FIG. 4, grate 24 is substantially level and is supported by upper supports 31 shown beneath grate 24 and above mesh 26, and atop intermediate supports 30. As would be further understood, mesh 26 substantially filters most solid waste matter from reaching the inside bottom surface of pan 25 and grate 24 which is coarser will withstand the weight of goats thereon. Removable container 28 is relatively small compared to pan 25 and can be replaced with another container periodically as needed. Pan 25 can be formed from a suitable metal, plastic or the like which is both durable and resistant to corrosion from urine 11.

The illustrations and examples provided herein are for explanatory purposes and are not intended to limit the score of the appended claims.

I claim:

1. A method of luring deer comprising the steps of:
   (a) saturating an absorbent with a scent producing lure, said lure substantially comprising urine from a goat; and
   (b) allowing the scent from the absorbent to permeate the atmosphere to attract deer.

2. The method of claim 1 wherein the step of saturating an absorbent comprises dipping cotton in the urine.

3. The method of claim 1 wherein the step of allowing the scent to penetrate the atmosphere comprises the step of suspending the absorbent material above the ground.

4. The method of claim 3 wherein the step of suspending the absorbent material comprises spacing three independent absorbents in a triangular configuration.

5. The method of claim 4 and including the step of applying urine from a goat at the approximate center of the triangular configuration.

6. The method of claim 4 wherein the step of spacing three independent absorbents in a triangular configuration comprises spacing three independent absorbents each approximately twenty yards from the others.

7. A method of luring deer comprising the steps of:
   (a) wetting a selected site with a scent producing lure, said lure comprising urine from a goat; and
   (b) allowing the scent from the lure to permeate the atmosphere to attract deer.

* * * * *